3,014,060
PREPARATION OF DIALKOXYBORANES
Jack D. Bush, Kansas City, Mo., assignor to Callery Chemical Company, Pittsburgh, Pa., a corporation of Pennsylvania
No Drawing. Filed Apr. 1, 1955, Ser. No. 498,735
8 Claims. (Cl. 260—462)

This invention relates to the preparation of dialkoxyboranes, $HB(OR)_2$, where R is a lower alkyl radical, and more particularly it relates to a new and improved method for preparation of dimethoxyborane, $$HB(OCH_3)_2$$

by the reaction of trimethoxyboroxine, $B_3O_3(OCH_3)_3$ or solutions of boric oxide in trimethylborate with alkali metal hydrides and alkali metal borohydrides.

Dimethoxyborane was prepared in 1933 by Schlesinger and Burg (J.A.C.S. 55, 4020) from methanol ($CH_3OH$) and diborane ($B_2H_6$) in yields of about 60%. This method however required a large excess of diborane and the reaction was extremely exothermic requiring rigid temperature controls to prevent decomposition of the product. In 1939, Brown, Schlesinger and Burg (J.A.C.S. 61, 673) reported the preparation of dimethoxyborane from diborane and methyl formate. This reaction is much slower than with methanol and requires about 11 hours to go to completion. Both of these methods possess the inherent disadvantage of the use of diborane as a starting material which makes them economically unattractive. Since the primary use of dimethoxyborane is as an intermediate in the preparation of diborane any method which utilizes diborane as a starting material is obviously not feasible.

It is an object of this invention to provide a simple and economical method for preparing dialkoxyboranes which does not require the use of diborane as a starting material.

Another object of this invention is to provide a new and useful method for preparing dialkoxyboranes $$[HB(OR)_2]$$

in substantial yields from trialkoxyboroxines $$[B_3O_3(OR)_3]$$

where R is a lower alkyl radical (or solutions of boric oxide in trialkylborates) with alkali metal hydrides (MH) and alkali metal borohydrides [$MBH_{4-x}(OR)_x$, where R is a lower alkyl radical and x is 0 to 3].

Other objects of this invention will become apparent throughout the specification and appended claims which follow.

This new and improved method for preparing dialkoxyboranes will be more fully described hereinafter and the novelty thereof will be particularly pointed out and distinctly claimed.

This invention is based upon the discovery that hydrides and borohydrides of alkali metals, such as sodium hydride, sodium trimethoxyborohydride and sodium borohydride, will react with trialkoxyboroxines or solutions of boric oxide in trialkylborates to produce dialkoxyboranes. Thus, dimethoxyborane can be prepared as illustrated by one or more of the following reactions:

$3NaBH_4 + 2B_3O_3(OCH_3)_3 + 6B(OCH_3)_3$
$\rightarrow 12HB(OCH_3)_2 + 3NaBO_2$
$6NaBH_4 + 7B_3O_3(OCH_3)_3 + 9B(OCH_3)_3$
$\rightarrow 24HB(OCH_3)_2 + 3Na_2B_4O_7$
$6NaBH_4 + 10B_3O_3(OCH_3)_3 + 6B(OCH_3)_3$
$\rightarrow 24BH(OCH_3)_2 + 3Na_2B_6O_{10}$
$6NaH + 10B_3O_3(OCH_3)_3$
$\rightarrow 6HB(OCH_3)_2 + 3Na_2B_6O_{10} + 6B(OCH_3)_3$
$6NaBH(OCH_3)_3 + 10B_3O_3(OCH_3)_3$
$\rightarrow 6BH(OCH_3)_2 + 3Na_2B_6O_{10} + 12B(OCH_3)_3$ It should be noted that the stoichiometry of these postulated reactions is uncertain. However the solid residue from the reaction contains sodium, boron, and oxygen in a ratio approximately the composition of $Na_2B_6O_{10}$ and would thus indicate that the desired ratio of reactants for continuous operation would be in accord with the reaction which favors the formation of $Na_2B_6O_{10}$. The use of boric oxide in the form of a trialkoxyboroxine, such as trimethoxyboroxine is advantageous in this reaction because it provides a Lewis acid of sufficient strength to volatilize high concentrations of dimethoxyborane, it elevates the boiling point of the mixture so as to give more rapid reactions, and it is the only practical way to evolve dimethoxyborane from the unreactive sodium borohydride.

The apparatus used to study this reaction consisted of a 3-necked flask of suitable capacity which was fitted with a mercury-sealed Hirschberg stirrer, a thermometer and an 18″ Vigreaux column. The Vigreaux column was connected to an ice water, cold-finger type condenser, then to a U-type −80° C. trap, a U-type −190° C. trap, and finally to a mercury bubbler and a wet test meter.

When $NaBH_4$ is added to a trialkoxyboroxine, such as trimethoxyboroxine, there is at first very little dimethoxyborane in the vapor over the system. However, soon the surface of the $NaBH_4$ is altered and a flocculent white precipitate forms. As refluxing is continued the concentration of dimethoxyborane builds up substantially. After a short time, the vapors contain an appreciable concentration (10–40 wt. percent) of dimethoxyborane and this percentage can be maintained over a considerable length of time even though continuous removal of distillate occurs. The concentration and yield of dimethoxyborane are calculated on the basis of the hydric hydrogen (also referred to as active hydrogen) content of the distillate. Active hydrogen (or hydridic hydrogen) is measured by the volume of hydrogen evolved upon complete hydrolysis of a measured sample of the product. Removal of the distillate causes the boiling point of the remaining solution to rise due to a depletion of the mixture with respect to the trimethyl borate. Unless additional trimethyl borate is added to maintain the original boiling point, the solution becomes very viscous, heat transfer is increasingly difficult, and charring and gel formations result. The precipitate which forms is a sodium borate having the apparent composition $Na_2B_6O_{10}$. After washing this precipitate with trimethyl borate, no active hydrogen could be detected in the residue. This sodium borate precipitate can be removed if desired from the reaction vessel and the boron values recovered by further reaction with methanol.

In one experiment using the apparatus described, 0.5 g. of $NaBH_4$, 200 ml. of trimethylborate and 50 g. of trimethoxyboroxine mixed with 60 ml. of trimethylborate were placed in the reaction flask and refluxed. An oily layer formed on top of the mixture which gradually turned white and gel like. Stirring dispersed this material but later a white mass formed around the particles of $NaBH_4$. The addition of more trimethoxyboroxine caused dispersion of this white bulky precipitate. The mixture was allowed to stand at 75° C. overnight and in the morning a definite crystalline precipitate had separated. An additional 1.7 g. of $NaBH_4$ was added to the mixture and vapor evolution became visible immediately. The first 10 ml. of condensate collected in the cold traps contained about 15 wt. percent dimethoxyborane. A total of 125 ml. of condensate was collected while 125 ml. of trimethyl borate was added slowly to maintain a boiling point of 90°–100° C. The condensate which was a mixture of about 10 to 18 wt. percent dimethoxyborane in trimethyl borate was distilled and a total of 64% of the available active hydrogen (based on the NaBH₄ reacted) was isolated as pure dimethoxyborane with a boiling point of 26° C. Since trimethylborate boils at 68° C., separation of the two materials by distillation through a simple Vigreaux column is readily accomplished. The precipitate formed was washed with trimethylborate and no active hydrogen was detected in the solid.

In another experiment 50 g. of sodium trimethoxyborohydride, NaHB(OCH₃)₃, was added to 300 ml. of trimethoxyboroxine and the mixture was gently refluxed. The distillate (100 ml.) collected in the cold traps contained about 5.2 wt. percent dimethoxyborane dissolved in trimethyl borate and was separated by distillation. In this experiment the pot temperature rose gradually to 200° C. and the material in the pot solidified due to a depletion of the trimethyl borate.

In still another experiment, one mol (24 g.) of sodium hydride and 300 ml. of trimethoxyboroxine were heated at a reflux ratio of 9:1. After 100 ml. of distillate were collected the head temperature of the column had risen to 60° C. This sample analyzed 4.7 wt. percent of dimethoxyborane. The next sample of distillate was collected at a head temperature of 60-66° C. and contained 0.7 wt. percent of dimethoxyborane. The reflux ratio was then increased to 20:1 and a sample of distillate collected which contained 17 wt. percent of dimethoxyborane. In this manner, 67% of the active hydrogen charged as sodium hydride was recovered as dimethoxyborane. The solid in the pot was separated and upon analysis was found to contain little active hydrogen thus indicating substantially complete reaction.

Other experiments in which triethoxyboroxine, $B_3O_3(OCH_2H_5)_3$ and tri-n-propoxyboroxine, $B_3O_3(OC_3H_7)_3$ were used in place of trimethoxyboroxine and reacted with sodium hydride, sodium borohydride or sodium trimethoxyborohydride provided evidence (active hydrogen was volatilized from the reaction mixture and recovered in the distillate) for the formation of diethoxyborane and dipropoxyborane in this reaction.

The term trialkoxyboroxine $B_3O_3(OR)_3$ is intended to define the material having that composition and which is believed to be a chemical compound. It should be noted however that some chemists believe this material to be a solution of $B_2O_3$ in the trialkyl borate $B(OR)_3$ rather than a compound. Because of this uncertainty the material is referred to both as the compound trialkoxyboroxine and as a solution of $B_2O_3$ in the alkyl borate $B(OR)_3$. The use of trialkoxyboroxine in this process does not appear to be materially affected when diluted with excess trialkyl borate or when containing excess $B_2O_3$ in solution.

The dialkoxyboranes described herein are valuable intermediates in the preparation of diborane and other boron containing compounds.

Although several embodiments of this invention have been described it should be understood that within the scope of the claims appended hereto this invention may be practiced otherwise than as specifically described.

What I desire to claim and secure by United States patent is:

1. A method of preparing dialkoxyboranes which comprises refluxing a mixture of a lower alkyl trialkoxyboroxine and a compound of the class consisting of alkali metal hydrides, alkali metal borohydrides and alkali metal alkoxyborohydrides, and recovering the dialkoxyborane formed.

2. A method of preparing dialkoxyboranes which comprises refluxing a mixture of a trialkoxyboroxine, $B_3O_3(OR)_3$, where R is a lower alkyl group, a trialkylborate, $B(OR)_3$ where R is a lower alkyl group and a compound of the class consisting of MH and $MBH_{4-x}(OR)_x$ where M is an alkali metal, R is a lower alkyl group and $x$ is a number from 0 to 3, and recovering the dialkoxyborane formed.

3. A method according to claim 2 in which R of the trialkoxyboroxine is a methyl group and M is sodium.

4. A method according to claim 2 in which R of the trialkoxyboroxine is an ethyl group and M is sodium.

5. A method according to claim 2 in which R of the trialkoxyboroxine is a propyl group and M is sodium.

6. A method of preparing dialkoxyboranes which comprises heating a mixture of a lower alkyl trialkoxyboroxine and a compound of the class consisting of alkali metal hydrides, alkali metal borohydrides and alkali metal alkoxyborohydrides, and recovering the dialkoxyborane formed.

7. A method of preparing a borane which comprises reacting a trialkoxyboroxine and an alkali metal hydride, and recovering the borane formed.

8. A method of preparing a borane which comprises heating a mixture of a lower alkyl trialkoxyboroxine and an alkali metal borohydride and recovering the borane formed.

No references cited.